Sept. 8, 1936.  E. N. MERRILL ET AL  2,053,967
APPARATUS FOR DETERMINING WELL TEMPERATURES
Filed Jan. 15, 1936
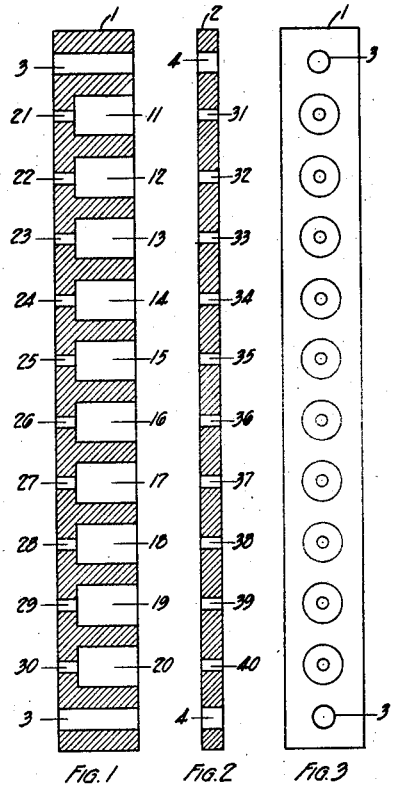
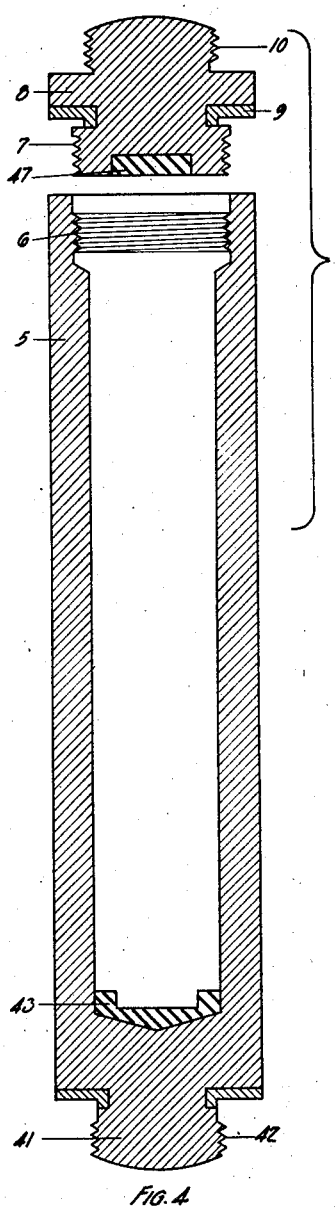
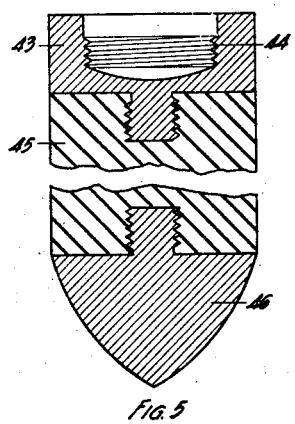
Inventors:
Ernest N. Merrill
George A. Young
By their Attorney Patented Sept. 8, 1936

2,053,967

UNITED STATES PATENT OFFICE 2,053,967

APPARATUS FOR DETERMINING WELL TEMPERATURES

Ernest N. Merrill and George A. Young, Long Beach, Calif., assignors to Shell Development Company, San Francisco, Calif., a corporation of Delaware Application January 15, 1936, Serial No. 59,324

5 Claims. (Cl. 73—32)

In production work connected with the drilling of deep oil wells, subsurface temperatures have often to be determined, both for purposes of scientific research and for reasons of practical advantage, as, for example, in predicting the possibility of satisfactorily cementing off a water formation.

Many temperature-indicating instruments which were tried in effecting these measurements have been found to possess various defects. Thus, mercury thermometers of the maximum registering type are usually insufficiently accurate, their readings being affected by the jarring to which they are subjected on being raised from the borehole. Some especially designed recorders, such, for example, as electrical thermometers, are expensive, and require careful handling by trained observers.

To overcome these difficulties, it has been proposed to determine well temperatures by means of indicators using fusible metal fragments similar to the fusible cones used, for example, in the ceramic industry. For this purpose, a suitably constructed bomb is loaded with a plurality of calibrated fragments of solids having different known melting points. The indicating bomb is then run into the well in any convenient manner, allowed to rest therein for a sufficient length of time, and is then raised to the surface, the temperature prevailing in the well being determined by observing which of the calibrated fragments had melted.

The disadvantage of this system resides mainly in the amount of time necessary for the fragments to assume the temperature of the surrounding medium and thereby to reach their melting point. The indicating bomb itself, having a large surface of contact with the liquid filling the borehole, promptly assumes through heat-exchange the temperature of that liquid. Since, however, it is usually necessary to exclude the outside liquid and pressure from the interior of the bomb to avoid any fluctuations in the calibrated melting points of the fragments, the heat exchange between the body of the bomb and the fusible fragments proceeds at a relatively slow rate. This is especially true if irregularly-shaped fragments are used, since such fragments are only in a very imperfect direct contact with the body of the bomb and receive heat mainly through the medium of the air filling the bomb. However, even if fragments in the shape of cartridges are provided to fill special chambers in the bomb, these fragments have to be molded to a size smaller than the chambers in order that a change in shape may be noticeable on melting, and the air-gap between the cartridges and the walls of the chambers tends to hinder considerably the heat-exchange. Moreover, exactly molded fusible alloys are relatively expensive to manufacture, and since about 65% of them is lost through fusion during each run, their use involves considerable expense.

It is the object of this invention to provide an apparatus for indicating well temperatures by means of fusible alloys, whereby the process of measuring said temperatures can be carried out much more rapidly, and the use of small irregularly-shaped fusible fragments is made possible due to an improved heat-exchange between the fragments and the body of the bomb through the medium of a liquid filling said bomb.

Another object of this invention is to provide a temperature indicating bomb of sturdy and simple construction which may, if desired, be manufactured at the well itself from materials usually available in production fields.

The construction and method of operation of this temperature-indicating bomb will be clear from the following description taken with reference to the attached drawing. It is, of course, understood that both description and drawing only serve to illustrate one of the many possible embodiments of the invention, and should in no way be taken to limit said invention as defined by the appended claims. In the drawing Fig. 1 is a cross-sectional elevation view of the box in which the fusible fragments are placed, Fig. 2 is a similar view of a cover for the box of Fig. 1, Fig. 3 is a plan view of Fig. 1, Fig. 4 is a casing, such as a hollow steel sub, adapted to hold the box and cover of Figs. 1 and 2.

Fig. 5 is a sectional view of a head adapted to be attached to the lower end of the casing.

Referring to Figs. 1–3, a box 1, preferably made of a metal such as brass, bronze, copper, cast iron, etc., is provided with compartments 11—20. A cover plate 2, shown in Fig. 2, is adapted to fit over the box 1, and may be held in place by screws or bolts passed through holes 3 and 4 in the box and the cover plate, respectively. Small holes 21—30 and 31—40 are drilled through the cover plate and through the bottom of the box in each compartment to facilitate heat interchange by liquid convection.

Fig. 4 represents an ordinary hollow tubular sub 5, such as are commonly used for many purposes in production work. The sub is made of steel or other suitable material, and has a sufficient inside diameter to receive box 1. The sub is provided at its upper end with interior threads 6, adapted to receive exterior threads 7 of a cap 8 which is screwed into and closes the sub 1. To insure a tight fit which is desirable to protect the interior of the sub from outside pressure and temperature, cap 8 may be provided with a shoulder 9, made of copper, brass, rubber or any other elastic material. The cap is also provided with upper threads 10 by means of which the whole device may be attached to the end of a tubing string. If desired, instead of threads 10, cap 8 may be provided with an anse or any other suitable attachment by means of which the device may be lowered into the well at the end of a wire line.

If desired, sub 5 may be provided at its lower end with a projection 41, having threads 42. To this projection, another sub, or any other device, for example, a pressure recorder, an inclinometer, etc., may be attached so that several different determinations may be effected at once.

It is likewise possible to screw on to the attachment 41 a special head, such as shown in Fig. 5, comprising a metallic upper plate 43, internally threaded at 44 to receive the threads 42 of the sub 5. This head is also preferably provided with a lower metallic pointed end 46. The parts 43 and 46 are connected by an intermediate portion 45, made of rubber or other resilient material. With this arrangement, it becomes possible to use the temperature recording bomb in go-devil fashion, that is, to let it drop freely into the well. For example, when it is desired to measure the temperature at the bottom of the bore-hole prior to withdrawing and changing the drill bits, the recording bomb may be dropped into the tubing, and then withdrawn and recovered with the drill bit. The head 46 serves to guide the device through the tubing, while the resilient portion 45 breaks the fall and prevents excessive jarring of the fragment-containing box, which may further be cushioned inside the sub 5 by means of resilient pads 47 and 48 provided in the cap 8 and the sub 5, respectively.

It is obvious that instead of the sub 5 described above, any other form of bomb or casing for the fusible fragments may be used, provided it is capable of holding liquid and of effectively excluding outside pressure and well liquids.

In operation, calibrated samples of fusible alloys differing from each other by any desired number of degrees and corresponding to any desired temperature range are placed into the numbered compartments of box 1. These samples may be of any desirable shape; the cheapest and simplest procedure being to use them in the form of small sharp-edged fragments. The cover 2 is fixed over the box 1 by means of screws or bolts passing through holes 3 and 4, and the box is placed in the sub. The interior of the sub is then filled with water or any other liquid having good heat-conducting properties, and the sub closed by means of cap 8, the fusible fragments being in this way protected from outside pressure and liquid. The device is then lowered into the well to the desired depth and left therein for a sufficient time to permit the fragments to assume the temperature of the surrounding medium, for example, half an hour or an hour. As stated above, the heat interchange between the fragments and the body of the sub proceeds, according to this invention, much more rapidly than in the case of gas-filled bombs, since water is superior to air in heat conducting properties, and the fragments therefore do not have to rely upon direct contact with the body of the bomb to assume its temperature.

After sufficient time has elapsed to permit complete heat-interchange, the instrument is withdrawn from the well, and the desired well temperature is easily determined by observing the condition of the fusible fragments, since these fragments lose their sharp edges on melting. The desired temperature is assumed to lie midway between the calibrated melting temperature of the melted sample having the highest melting point, and the calibrated melting temperature of the unmelted sample having the lowest melting point. By making the intervals between the melting points of the several fragments sufficiently small, any degree of accuracy, such for example, as 1° F., may be obtained. For ordinary production work, however, intervals of from 10° to 20° F. are usually satisfactory.

While it is possible to use for the process of this invention fragments of substances other than metals, such as wax, spermacetti, naphthalene, etc., the range of temperatures prevailing in wells makes it especially advantageous to use fragments made of fusible alloys, a list of which, together with their melting points, covering a range from 120° to 362° F., is shown in table 1.

In making the alloys of table 1, a base metal was prepared by compounding together various amounts of four constituent metals such as bismuth, lead, tin and cadmium, and then admixing to the basic mixtures progressively decreasing percentages of mercury to give a wide variety of alloys having intermediate temperatures.

*Table 1*

| Base metal | | | | Fusible alloy | | |
| --- | --- | --- | --- | --- | --- | --- |
| Percent bismuth | Percent lead | Percent tin | Percent cadmium | Percent base metal | Percent mercury | Melting temperature ° F. |
| 43.75 | 25.0 | 25.0 | 6.25 | 75 | 25 | 120 |
| 43.75 | 25.0 | 25.0 | 6.25 | 80 | 20 | 130 |
| 43.75 | 25.0 | 25.0 | 6.25 | 85 | 15 | 140 |
| 43.75 | 25.0 | 25.0 | 6.25 | 90 | 10 | 150 |
| 43.75 | 25.0 | 25.0 | 6.25 | 95 | 5 | 160 |
| 43.75 | 25.0 | 25.0 | 6.25 | 100 | 0 | 170 |
| 50.0 | 25.0 | 25.0 | -------- | 94 | 6 | 176 |
| 50.0 | 25.0 | 25.0 | -------- | 96 | 4 | 186 |
| 50.0 | 25.0 | 25.0 | -------- | 98 | 2 | 196 |
| 50.0 | 25.0 | 25.0 | -------- | 100 | 0 | 208 |
| 30.8 | 38.4 | 30.8 | -------- | 90 | 10 | 220 |
| 30.8 | 38.4 | 30.8 | -------- | 92 | 8 | 230 |
| 30.8 | 38.4 | 30.8 | -------- | 94 | 6 | 240 |
| 30.8 | 38.4 | 30.8 | -------- | 96 | 4 | 250 |
| 30.8 | 38.4 | 30.8 | -------- | 100 | 0 | 262 |
| -------- | 34.0 | 66.0 | -------- | 70 | 30 | 268 |
| -------- | 34.0 | 66.0 | -------- | 71 | 29 | 278 |
| -------- | 34.0 | 66.0 | -------- | 83 | 17 | 290 |
| -------- | 34.0 | 66.0 | -------- | 86 | 14 | 315 |
| -------- | 34.0 | 66.0 | -------- | 93 | 7 | 340 |
| -------- | 34.0 | 66.0 | -------- | 100 | 0 | 362 |

Virtually, a straight line relationship is found to exist between the percentage of mercury added and the corresponding lowering of the melting point in degrees Fahrenheit. Four basic mixtures may conveniently be used because the amount by which the melting point of any such mixture may be lowered is limited, the addition of excessive quantities of mercury causing the resulting alloys to be too soft.

We claim as our invention:

1. A temperature indicating device for boreholes, comprising a sealed metallic casing substantially filled with liquid and adapted to be placed in a bore-hole, and a plurality of solid fragments having calibrated melting points, said fragments being spaced from each other within the casing and immersed in the liquid filling said casing.

2. A temperature indicating device for boreholes comprising a sealed metallic casing substantially filled with liquid and adapted to be placed in a bore-hole, a plurality of chambers provided with liquid passages within said casing, and a plurality of solid fragments having calibrated melting points in said chambers.

3. A temperature indicating device for boreholes comprising a metallic casing substantially filled with liquid, a box adapted to be placed within said casing, a plurality of chambers provided with liquid passages in said box, solid fragments having calibrated melting points in said chambers, means to place said casing in a bore-hole, and means to exclude well pressure and liquid therefrom.

4. A temperature indicating device for boreholes comprising an elongated body adapted to be freely dropped into a bore-hole, flexible means forming a resilient cushion at the lower end of said body, a sealed casing filled with liquid at the upper end of said body, and a plurality of solid fragments having calibrated melting points, said fragments being spaced from each other and immersed in the liquid filling said casing.

5. A temperature indicating device for boreholes comprising an elongated body adapted to be dropped into the bore-hole, said body having rigid ends, a flexible connection providing a resilient cushion between the ends of the body, the upper end of said body forming a sealed casing filled with liquid and adapted to hold spaced from each other and immersed in said liquid a plurality of solid fragments having calibrated melting points.

ERNEST N. MERRILL.
GEORGE A. YOUNG.